April 29, 1930.  C. A. HOXIE  1,756,864
FILM DRIVING APPARATUS
Filed April 19, 1929
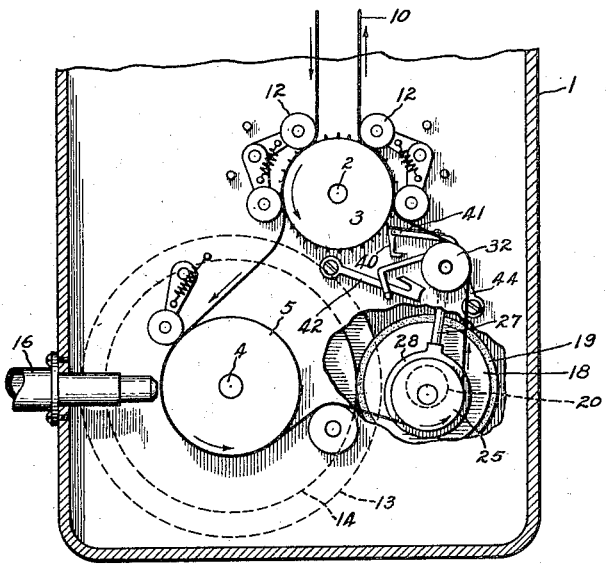
Inventor
Charles A. Hoxie
by Charles E. Mullan
His Attorney.

Patented Apr. 29, 1930

1,756,864

UNITED STATES PATENT OFFICE

CHARLES A. HOXIE, OF ALPLAUS, NEW YORK, ASSIGNOR TO GENERAL ELECTRIC COMPANY, A CORPORATION OF NEW YORK

FILM-DRIVING APPARATUS

Application filed April 19, 1929. Serial No. 356,536.

My invention relates to apparatus for making a sound record on a film of the motion picture type and to apparatus for reproducing the sound from a sound record on such a film; more particularly it relates to that part of the apparatus by means of which the film is driven.

The object of my invention is the provision of improved apparatus of this character which is of simple construction, inexpensive to manufacture and effective to move the film with the desired uniform speed.

My invention will be better understood from the following description taken in connection with the accompanying drawing, and its scope will be pointed out in the appended claims.

Referring to the drawing, Fig. 1 illustrates one embodiment of my invention; Fig. 2 is a cross sectional view of the same; and Figs. 3, 4 and 5 show details thereof.

In the drawing the casing 1 which supports the apparatus includes parallel walls in which are journalled the sprocket shaft 2 having the sprocket 3 on one end thereof and the drum shaft 4 having at one end thereof the drum 5. The sprocket 3 is adapted to be rotated at constant speed and is connected to the main driving shaft 6 by means of the gears 7 and 8. Sprocket 3 which is shown engaging the film 10 of the motion picture type at two spaced points thereof is, in the case of apparatus such as illustrated for making a film record of sound, adapted to perform the work of withdrawing the film from the take-off reel (not shown) and of feeding the film toward the take-up reel (also not shown). Between the two points of contact with the sprocket, the film extends over the drum 5 and apparatus to be described later for governing the speed of the drum. For holding the film in contact with the sprocket, I have shown two sets of pressure rolls 12 which can be readily thrown out of engagement with the sprocket when the operator threads the film. On the drum shaft 4 is mounted the flywheel 13 and the driven wheel 14, these two wheels being shown on the drawing as parts of a single unit. In the wall of the casing 1 is mounted the tube 16 forming a part of the optical system by means of which a narrow band of light controlled by the sound waves being recorded is directed upon the film, the film at the point of exposure being supported by the smooth surface of the drum.

In the apparatus which I have devised the film is driven by both the sprocket and the drum. In apparatus of this character where the film is supported and moved by a drum at the point of exposure, and the same is true of reproducing apparatus in which the film is supported and moved by a drum at the point where the record is read off the film, it is essential for the faithful recording of the sound, or reproduction thereof in the case of a reproducer, that the drum rotate uniformly and that no slipping of the film occur on the drum. Since both the sprocket and the drum are positively driven from the same drive shaft 6, it is necessary to regulate their relative speeds for if no slipping of the film on the drum is to be permitted they will not in practice move the film at exactly the same rate. Even though the diameters and speeds of the sprocket and drum were theoretically correct for producing equal film speeds, shrinkage of the film in various amounts found in practice would, after a few hundred feet of film had been passed through the apparatus, result in a tightening of the film at one side of the drum and an accumulation of film at the other side thereof. In accordance with the apparatus which I shall now describe I cause the drum to be rotated at a speed which is governed by the rate at which the film is moved by the sprocket. Driving connection from the main drive shaft 6 to the driven wheel 14 is through the driving wheel 18 having the soft rubber periphery or tire 19 fixed thereto. Wheel 18 is rotatably mounted on the eccentric 20 which in turn is mounted on the sleeve extension 21 of the bearing member 22. This member is secured by screws 23 to a wall of the casing 1 and forms a bearing for a reduced extension 24 of the shaft 6. On the outer end of this shaft extension is the film engaging idler 25. By means of the arm 27 the eccentric 20 is angularly adjusted so as to cause the soft tire 19 on wheel 18 to press a variable amount against the driven wheel 14. Arm 27 is fixed to ring 28 which ring is adjustably mounted on ring 29 fixed to the eccentric 20. Adjustment of the ring 28 on ring 29 is effected by the screw 30 which is supported by ring 28 and engages a threaded annular groove in ring 29. On its free end the arm 27 has the freely rotatable idler 32 which engages the film between idler 25 and sprocket 3.

Since the axis of drive wheel 18 is eccentric to the axis of rotation of drive shaft 6 and moves laterally with angular adjustments of the arm 27, an operative connection between shaft and the wheel must be provided whereby the angular velocity of the wheel at all parts of its rotation shall exactly equal the angular velocity of the drive shaft. The connection which I have shown for this purpose comprises the cross arm 35 secured to shaft 6 and having rotatably mounted thereon the two equal gear wheels 36. Meshing with these two gear wheels is the third gear wheel 37 having the same number of teeth and fixed to an extension on the eccentric. Each gear wheel 36 has a pin 38 extending from its face and arranged to slide in a radial groove in the adjacent face of wheel 18. The pins 38 are eccentrically mounted in the gears 36 the eccentricity being the same as that of the eccentric 20.

The above described construction operates in the following manner: Suppose the parts to be in the position shown by Fig. 1 wherein the driving wheel 18 is pressed against the driven wheel 14 an amount such as to cause a partial flattening of the soft rubber tire 19 at the point of contact. If with that degree of pressure the drum is being rotated at just the right speed to move the film as fast as it is moved by the sprocket, the contact arm 27 and idler 32 will remain in that position. If, however, the drum is rotating a little too slow, that part of the film extending over the idler 32 becomes more taut and thereby moves the arm 27 counterclockwise. This shifts the eccentric so as to cause the wheel 18 to press harder against the driven wheel 14 flattening down slightly more the soft rubber tire 19 at the point of contact. The resulting speed of the driven wheel and the drum contrary to what might be expected is increased. Conversely, if the drum speed is a little too fast, the arm 27 will move clockwise shifting the drive wheel 18 so as to decrease the pressure between it and the driven wheel whence the driven wheel and drum rotate more slowly. It is to be understood that no slipping whatever occurs between the driving and the driven wheels and that the above described speed variation between those wheels is purely a function of the pressure to which the soft rubber tire is subjected. In addition the soft rubber tire serves to damp out vibrations in the driving torque, such, for example, as those which may arise from gearing, etc., in the connection to the driving motor. It forms a flexible driving member for the drum, directly associated with it and arranged between it and any and all gearing included in the drive connection.

The apparatus which I have devised is arranged to be driven by an electric motor, for example, a synchronous motor which through suitable reduction gearing connects with the shaft 6. Unless the motor is provided with some starting device, which is not usual with motors of the size employed to drive machines of this character, the motor when thrown on the line immediately starts off with a high torque quickly gaining full speed. Inasmuch as the film drum and flywheel are driven by a soft rubber tired wheel a certain amount of slipping between the tire and the driven wheel would occur each time the apparatus is started. I prefer to avoid this unnecessary wear of the rubber tire at starting and for this purpose have devised the apparatus which I shall now describe whereby the rubber tire does not contact with the driven wheel until the latter has reached approximately full speed. The arm 27 beyond the idler 32 is turned laterally and pivoted at the end thereof is the latch 40 being yieldingly held in the position illustrated by the leaf spring 41. The pivoted stop 42 has a projection which when the stop is raised engages the latch 40 so that the stop is retained in an elevated position. In this position, stop 42 engages portion 43 of the arm 27 supporting idler 32. Stop lifting lever 44 is arranged to be engaged by portion 43 and at its free end has a hook which receives the stop 42. These parts are so constructed and arranged that when a film is threaded in the machine and the idler 32 is moved to the right as viewed in Fig. 1 the stop 42 is raised by lever 44 and latched up in the raised position. The soft rubber tire is now out of contact with the driven wheel 14, see Fig. 3. The sudden start of the sprocket 3 when the motor is thrown on the circuit gives the film a jerk which shifts the arm 27 carrying idler 32 until it is stopped by the stop 42. During this movement the stop 42 is released but the movement of the arm 27 is so rapid that the stop is caught thereby before it has time to fall. Even in the new position of the arm 27 and idler 32 the rubber tire 19 does not engage the driven wheel. The film in passing over the drum quickly brings it and the flywheel up to speed, the tension in the film serving to hold portion 43 of the arm 27 firmly against stop 42. When the drum and flywheel reach full speed the film tension drops to a low value when the reaction of the wheel 18 on the eccentric withdraws the arm 27 from the stop 42, allowing the latter to drop to the position shown in Fig. 1. The rubber tired wheel 18 is now free to engage wheel 14 and to take up the work of driving the drum and flywheel as has already been described.

While I have described my invention as forming a part of a sound recorder it is by no means limited to such apparatus but is equally applicable to apparatus for reproducing sound from a sound film record in which case the light beam passes through the film into a photo-electric cell in the well understood manner.

Inasmuch as the purpose of my invention is to drive the film past the light beam, the optical system may be arranged to direct the beam of light on the film at some point prior to the drum. For example, a gate or a skid may be provided between the drum and sprocket and the film exposed to the light beam as it passes through the gate or over the skid in which case the drum functions merely as a pulley for drawing the film at the proper uniform speed.

I have chosen the particular embodiment described above as illustrative of my invention and it will be apparent that various modifications may be made without departing from the spirit and scope of my invention, which modifications I aim to cover by the appended claims.

What I claim as new and desire to secure by Letters Patent of the United States, is:

1. Film driving apparatus comprising a plurality of driving members arranged to engage a film at spaced points, and means for varying the speed of one of said members in accordance with the length of film between the members, said means comprising a driven wheel connected with said one member, a driving wheel having a resilient face in non-slipping engagement with said driven wheel, a movable member arranged to engage the film between said members, and means responsive to movement of the movable member for varying the pressure of the driving wheel against the driven wheel.

2. Film driving apparatus comprising a sprocket member and a drum member arranged to engage a film respectively at points spaced longitudinally thereof, and means responsive to the length of film between said members for controlling the speed of one of the members, said means comprising a driven wheel connected with said one member, a driving wheel having a resilient face in non-slipping engagement with the driven wheel, and a member engaging the film between the sprocket and drum members for varying the pressure between said driving and driven members.

3. Film driving apparatus comprising a sprocket and a drum arranged to engage a film respectively at points spaced longitudinally thereof, and means responsive to the length of film between the sprocket and the drum for controlling the speed of the drum, said means comprising a driven wheel connected with said drum, a driving wheel having a resilient face in non-slipping engagement with the driven wheel, and a member engaging the film between the sprocket and the drum for varying the pressure between the driving and the driven members.

4. Film driving apparatus comprising a sprocket and a drum arranged to engage a film respectively at points spaced longitudinally thereof, a motor having a fixed driving connection with one of said members and a variable driving connection with the other of said members, said variable driving connection comprising a driven wheel in fixed relation with said other member, a driving wheel having a resilient periphery in non-slipping engagement with said driven wheel and mounted to be moved bodily relative thereto to vary the pressure therewith and means controlled by the length of film between the sprocket and the drum for moving the driving wheel.

5. Film driving apparatus comprising a sprocket and a drum arranged to engage a film respectively at points spaced longitudinally thereof, a motor having a fixed driving connection with the sprocket and a variable driving connection with the drum, said variable driving connection comprising a driven wheel in fixed relation with said drum, a driving wheel having a soft rubber periphery in non-slipping engagement with the driven wheel, and means controlled by a loop in the film between the sprocket and the drum for moving the driving wheel toward or from the driven wheel to vary the pressure between said wheels.

6. Film driving apparatus comprising a sprocket and a drum, the film being arranged to engage the sprocket at two points spaced longitudinally thereof and to engage the drum at a third point intermediate said spaced points, the film forming a free loop between the drum and one point of contact with the sprocket, a common driving member for the sprocket and the drum and a variable speed connecting means between said driving member and said drum having a controlling member engaging the film between the drum and the other point of its contact with the sprocket.

7. Film driving apparatus comprising a sprocket and a drum, the film being arranged to engage the sprocket at two points spaced longitudinally thereof and to engage the drum at a third point intermediate said spaced points, the film forming a free loop between the drum and one point of contact with the sprocket, a common driving member for the sprocket and the drum having a fixed driving connection with the sprocket and a variable driving connection with the drum, said variable connection comprising a driven wheel connected with the drum, a driving wheel therefor connected with the common driven member and having a soft rubber tire and means including a controlling idler engaging the film between the drum and the other point of its contact with the sprocket for varying the pressure between the driving and driven wheels thereby varying the relative speeds of said wheels without slippage.

8. Film driving apparatus comprising a pair of film driving members arranged to engage a film at spaced points thereof, a driven wheel connected to one of said members, an eccentric, a driving wheel having a resilient face mounted in said eccentric and arranged to be moved bodily relative to the driven wheel to vary the pressure therewith without slippage in accordance with length of film between said members, a drive shaft having fixed bearings, and a driving connection between said shaft and said driving wheel.

9. Film driving apparatus comprising a sprocket and a drum arranged to engage a film at spaced points thereof, a driven wheel connected with the drum, an eccentric having an arm in engagement with the film between the sprocket and the drum, a driving wheel having a resilient face mounted on said eccentric whereby angular movement of the eccentric varies the contact pressure without slippage between the driving and the driven wheels, a drive shaft in alinement with the axis of rotation of the eccentric, and a driving connection between the drive shaft and the driving wheel comprising a gear fixed to the eccentric, and cooperating planetary gears mounted on the shaft each having an eccentric pin engaging in a radial slot in the driving wheel, the eccentricity of the pins and the eccentric being equal.

10. Film driving apparatus comprising a rotatable drum adapted to engage and move a film at a uniform speed, a flywheel and driven wheel directly connected with said drum, a motor driven shaft subject to gear vibrations, and a wheel driven by said shaft having a soft rubber tire in driving engagement with said driven wheel.

In witness whereof, I have hereto set my hand this 18th day of April, 1929.

CHARLES A. HOXIE.